(No Model.)
J. T. POPE.
HAND SLED.
No. 279,430. Patented June 12, 1883.
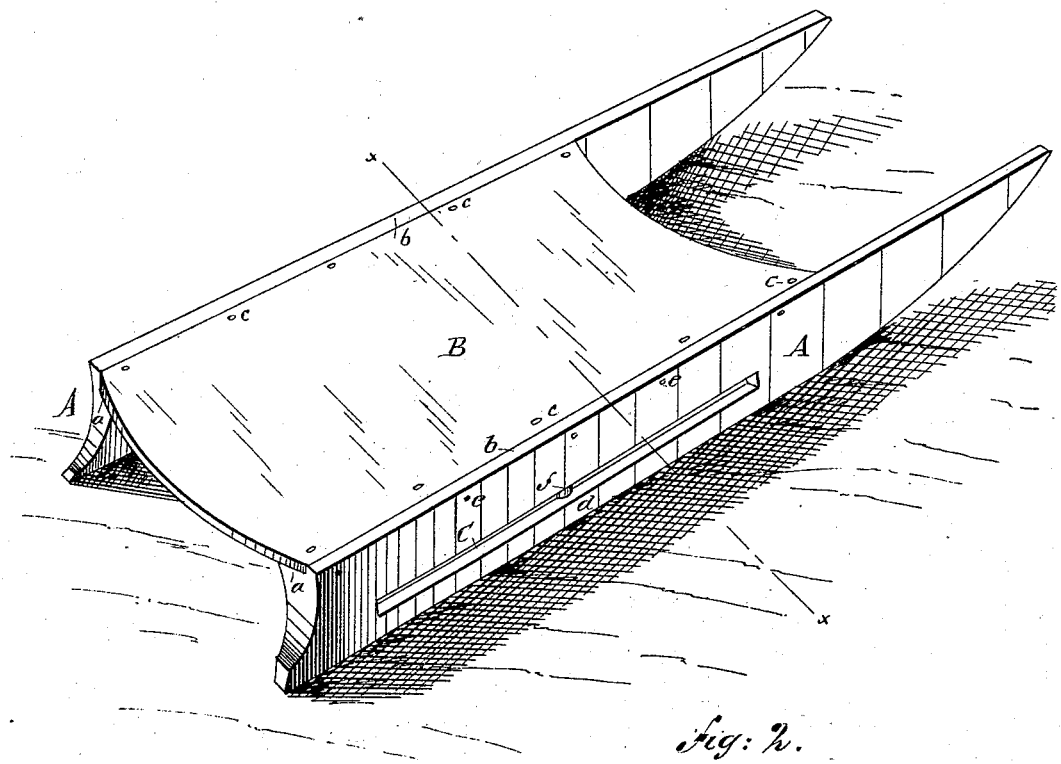
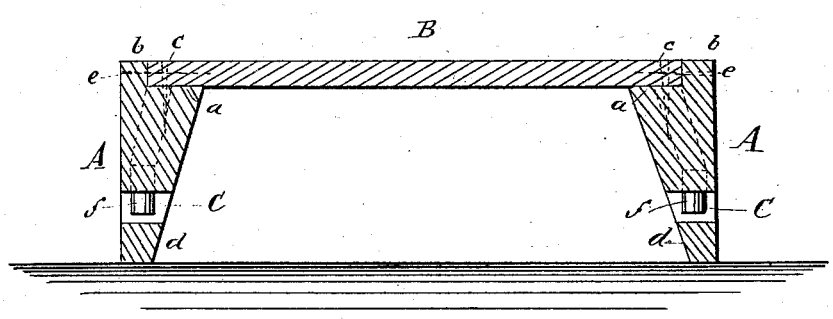
WITNESSES:
INVENTOR:
J. T. Pope
BY Munn & Co
ATTORNEYS.

UNITED STATES PATENT OFFICE.

JOSEPH T. POPE, OF HORSEHEADS, NEW YORK.

HAND-SLED.

SPECIFICATION forming part of Letters Patent No. 279,430, dated June 12, 1883.

Application filed October 6, 1882. (No model.)

*To all whom it may concern:*

Be it known that I, JOSEPH T. POPE, of Horseheads, in the county of Chemung and State of New York, have invented a new and Improved Hand-Sled, of which the following is a full, clear, and exact description.

This invention consists, first, in forming the runners of the sled with inwardly-projecting shoulders for supporting and bracing the sled seat-board; and, secondly, in forming the runners with springs to ease the jolt of the sled in passing over gutters, &c.

Reference is to be had to the accompanying drawings, forming part of this specification, in which similar letters of reference indicate corresponding parts in both the figures.

Figure 1 is a perspective view of my new and improved hand-sled; and Fig. 2 is a sectional elevation of the same, taken on the line $x\ x$ of Fig. 1.

A A represent the runners, and B represents the sled seat-board. The runners are formed with the wide shoulders $a\ a$, and also with the flanges $b\ b$, which latter are of a height equal to the thickness of seat B, so that when the runners and seat are secured together the flanges will stand flush with the upper surface of the seat. The seat B is secured to the runners by the nails or screws $c\ c$, passing through it near its edges into the shoulders $a\ a$, and by the nails or screws $e\ e$, passing through the flanges $b\ b$ into the edges of the seat, as shown in the drawings.

C C are slots cut through the runners to form the bars $d\ d$, which serve as springs to the sled. At or near the center of the slots C C are set into the runners the rubber or spring buffers $f f$, which to a certain extent resist the springing movement of the bars $d\ d$, and thus serve to prevent them from breaking under a heavy load or heavy jolt.

By constructing the runners with the shoulders $a\ a$ it will be seen that the necessity for cross-beams and separate braces in the sled is dispensed with, since the shoulders both support the seat B and at the same time brace the seat and the runners, and thus make the sled very simple and cheap, yet staunch and durable, and by slotting the runners to form the spring-bars $d\ d$ the jolt to the rider in passing over gutters, &c., is not so violent as it would be if the runners were made solid.

Having thus described my invention, what I claim as new, and desire to secure by Letters Patent, is—

1. The runners A, formed with the inwardly-projecting shoulders $a$, bracing the runners from their lower edges upward, for supporting the seat-board B, as set forth.

2. The runners A, formed with the slots C that form the spring-bars $d$, in combination with the spring-buffers $f$, substantially as and for the purposes set forth.

3. The hand-sled consisting of the runners A A, formed with the inwardly-projecting shoulders $a$, bracing said runners from their lower edges upward to the point of attachment of the seat, and flanges $b$, in combination with the seat B, secured to the runners, substantially as and for the purpose set forth.

4. The hand-sled made substantially as herein shown and described, consisting of the runners A A, formed with the shoulders $a\ a$ and spring-bars $d\ d$, and having the buffers $f f$, in combination with the seat B, secured to the runners by the nails or screws $c\ c$ and $e\ e$, as and for the purposes set forth.

JOSEPH T. POPE.

Witnesses:
 H. A. WEST,
 C. SEDGWICK.